2,960,517

SECONDARY AND TERTIARY AMINOPHENYL SILANES

Wilhelm J. Schnabel, Columbus, Ohio, assignor to Olin Mathieson Chemical Corporation, a corporation of Virginia No Drawing. Filed June 3, 1959, Ser. No. 817,738

8 Claims. (Cl. 260—448.2)

This invention relates to novel silicon-containing arylamines, useful as high temperature resistant fluids, as lubricants and as intermediates. More particularly, it relates to novel silicon-containing secondary and tertiary amines of the general formula:

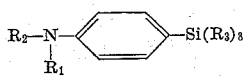

wherein $R_1$ is hydrogen, the organic radical:

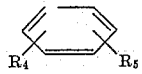

the naphthyl radical or the organic radical:

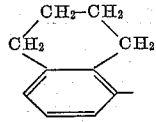

$R_2$ is the organic radical:

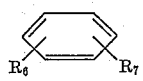

the naphthyl radical or the organic radical:

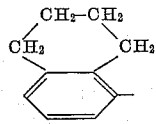

and $R_3$ is an alkyl or a phenylalkyl radical containing not more than 12 carbon atoms. $R_4$, $R_5$, $R_6$, and $R_7$ are selected from the group consisting of hydrogen, alkyl, alkoxy, phenyl, phenoxy, alkylsilyl, and phenylalkylsilyl radicals. Useful alkyl radicals of the alkyl and alkyl-containing substituents of $R_4$, $R_5$, $R_6$, and $R_7$ contain not more than 6 carbon atoms and include, for example, methyl, ethyl, propyl and hexyl.

It has been found that the novel silicon-containing secondary and tertiary amines can easily be prepared by reacting the alkali metal salt of an aromatic primary or secondary arylamine and a halophenyltri-(alkyl or phenylalkyl)-silane according to the following equation:

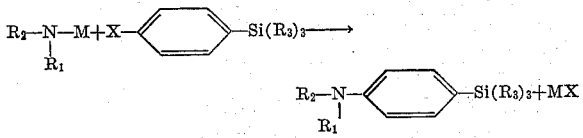

wherein $R_1$, $R_2$, and $R_3$ have the same meaning as previously defined, M is an alkali metal and X is a halogen. Halophenyltri-(alkyl or phenylalkyl)-silanes, useful as starting materials, include, for example, p-bromophenyltrimethylsilane, p-bromophenyltriethylsilane, p-bromophenyl-tri-n-butylsilane, p-bromophenyltribenzylsilane, p-bromophenyltriphenylethylsilane and the corresponding iodine and chlorine derivatives. Suitable primary and secondary arylamines include phenylamine, 2,4-dimethylphenylamine, p-tolyl-phenylamine, dimethylphenyl-phenylamine, m-tolyl-p-methoxyphenylamine, m-biphenyl-phenylamine, m-tolyloxyphenyl-phenylamine, 4-trimethylsilylphenyl-2',4'-dimethylphenylamine, naphthyl-phenylamine, 5,6,7,8-tetrahydronapthyl-phenylamine, p-methoxyphenyl-phenylamine, diphenylamine, p-tolyl-biphenylamine, 2,4-dimethylphenyl-biphenylamine, 2,2'-dimethoxydiphenylamine, etc.

The reaction is carried out under an inert atmosphere such as nitrogen by adding the bromophenyl-(alkyl or phenylalkyl)-silane slowly to a solution or suspension of the alkali metal salt of the amine preferably dissolved in an excess of the amine. The alkali metal salt of the amine can be conveniently prepared by reacting the alkali metal at an elevated temperature with the amine. Although the novel reaction of this invention requires an elevated temperature of from about 125° to about 275° C., it can be carried out at or below the boiling point of the reaction mixture using a reaction vessel equipped with a reflux condenser. The reaction time can be varied widely from about 1 to 15 hours or more with the preferred time being from about 2 to 5 hours. After cooling, the reaction mixture is treated with water and then extracted with ether. The aqueous layer containing the alkali metal bromide is separated from the organic layer in a separatory funnel and discarded. From the remaining organic layer, the excess amine and the extractive agent are removed by distillation. Fractional distillation of the remainder of the organic layer yields the silicon-containing amine product.

The novel silicon-containing teritary amines of this invention are characterized by an unusualy wide liquid range in that they are liquids below room temperature and exhibit boiling points of from about 420° C. to about 440° C. The fact that these compounds are liquids below room temperature is surprising since arylsilanes containing alkylamino groups have rather high melting points, for example, p-dimethylaminophenyl-triphenylsilane melts at 144° to 146° C. These novel silicon-containing tertiary amines exhibit excellent thermal and hydrolytic stability. They are useful as high temperature resistant fluids, as lubricants and as heat transfer media.

Although the novel silicon-containing secondary arylamines of this invention are not useful as high temperature resistant fluids and lubricants per se, they are valuable intermediates for the preparation of silicon-containing tertiary arylamines which are useful as high temperature resistant fluids and lubricants. Such tertiary arylamines can be prepared by reacting the alkali metal salt of the novel silicon-containing secondary arylamine with the desired halogenated aromatic compound. These novel silicon-containing secondary arylamines are also useful as antioxidants.

The novel compounds of this invention and their preparation will be further illustrated by reference to the following examples.

EXAMPLE I

*4-triethylsilylphenyl-dipenylamine*

Potassium (3.9 g., 0.1 gram atom) was dissolved in an excess of diphenylamine (85 g., 0.5 mole) at 140° to 180° C. with stirring under nitrogen. The mixture was heated to 220° C. and p-bromophenyltriethylsilane (30 grams, 0.11 mole) was added dropwise over a period of one-half hour. The reaction mixture was stirred for three hours at 220° to 225° C. and cooled to room temperature. Approximately 200 milliliters of water was added with vigorous stirring and the resulting mixture was extracted with 250 milliliters of ether. After the ether was added, two layers were formed, the upper or organic layer containing the product and the lower or aqueous layer containing the potassium bromide formed during the reaction. The organic layer was distilled to remove the ether and the excess diphenylamine. Then the residue from the organic layer was fractionally distilled to yield a main fraction (26.5 g.) boiling at 175° to 190° C. (0.3 mm. Hg). Redistillation gave a colorless liquid (20.1 g., 55.0 percent of the theoretical quantity) boiling at 185° to 192° C. (0.4 mm. Hg); $n_D^{28}$ 1.6041.

Calcd. for $C_{24}H_{29}NS$: N, 3.90. Found: N, 3.97, 4.13.

Kinematic viscosity: 100° F., 204 centistokes; 210° F., 7.9 centistokes; ASTM slope, 1.00.

The thermal stability of 4-triethylsilylphenyl-diphenylamine was tested by heating a sample of 10.2826 g. for five hours at 700° F. A weight loss of 0.0838 g. or 0.8 percent was found. The refractive index was unchanged and the compound showed only a very slight change in color after heating.

EXAMPLE II (A) *p-Bromophenyltri-n-propylsilane* p-Bromophenyltri-n-propylsilane, which was utilized in this experiment, was prepared according to the method of G. Gruettner and E. Krause, Ber. 50, p. 1559 (1917), from p-bromophenyltrichlorosilane and 1-n-bromopropane. B.P. 166° to 170° (10 mm. Hg); $n_D^{32}$ 1.5195.

Calcd. for $C_{15}H_{25}BrSi$: Br, 25.50. Found: Br, 25.54, 25.69.

(B) *4-tri-n-propylsilylphenyl-diphenylamine*

Potassium (3.9, 0.1 gram atom) was dissolved in an excess of diphenylamine (85 g., 0.5 mole) at 140° to 180° C. The mixture was heated to about 220° and p-bromophenyl-tri-n-propyl silane (34.5 g., 0.11 mole) was added dropwise over a period of one-half hour. The reaction was stirred for three hours at 220° to 225° C. After the reaction mixture had been cooled to room temperature, the product was recovered in the same manner as described under Example I. Fractional distillation gave a colorless liquid (23.6 g., 58.8 percent of the theoretical quantity), boiling at 185° to 195° C. (0.3 mm. Hg); $n_D^{24}$ 1.5855.

Calcd. for $C_{27}H_{35}NSi$: C, 80.74; H, 8.78; N, 3.49; Si, 6.99. Found: C, 81.01, 80.78; H, 8.98, 8.69; N, 3.48, 3.63; Si, 7.20, 7.23.

Kinematic viscosity: 100° F, 144 centistokes; 210° F., 7.7 centistokes; ASTM slope, 0.93.

A sample of this compound weighing 5.9012 was heated for five hours at 700° F. to test the thermal stability. A weight loss of 0.0412 g., equal to 0.7 percent, was found. Only a slight change in color was observed after heating and the refractive index was unchanged.

EXAMPLE III (A) *p-Bromophenyl-tri-n-butylsilane*

The intermediate, p-bromophenyl-tri-n-butylsilane, was prepared from p-bromophenyltrichlorosilane and 1-n-bromobutane by the method described in part (A), Example II. B.P. 158° to 160° C. (2.0 mm. Hg), $n_D^{25}$ 1.5126.

Calcd. for $C_{18}H_{31}SiBr$: Br, 22.49. Found: Br, 21.89, 21.65.

(B) *4-tri-n-butylsilylphenyl-diphenylamine*

The tertiary amine was prepared in the same manner as described in Example I by reacting p-bromophenyl-tri-n-butylsilane (39.0 g. 0.11 mole) with the potassium salt of diphenylamine prepared by dissolving 3.9 g. (0.1 gram atom) of potassium in an excess of diphenylamine (85 g., 0.5 mole). Fractional distillation gave a colorless liquid (20.9 g., 47.1 percent of the theoretical quantity), boiling at 206° to 214° C. (0.3 mm. Hg), $n_D^{30}$ 1.5709.

Calcd. for $C_{30}H_{41}NSi$: N, 3.16. Found: N, 3.64, 3.70.

A sample of this compound weighing 8.4320 g. was heated for five hours at 700° F. with a weight loss of 0.1284 g. or 1.5 percent. The compound showed only a very slight change in color after the heating.

EXAMPLE IV (A) *p-Bromophenyl-tri-n-pentylsilane*

The intermediate, p-bromophenyl - tri - n - pentylsilane was prepared from p-bromophenyltrichlorosilane and 1-n-bromopentane by the method given in part (A) of Example II. B.P. 170 to 172° C. (0.9 mm. Hg), $n_D^{24}$ 1.5063.

Calcd. for $C_{21}H_{37}SiBr$: Br, 20.10. Found: Br, 20.15, 19.93.

(B) *4-tri-n-pentylsilylphenyl-diphenylamine*

The compound, p - tri - n - pentylsilylphenyl-diphenylamine was prepared in the same manner as described in Example I by reacting p-bromophenyl-tri-n-pentylsilane (43.7 g., 0.11 mole) with the potassium salt of diphenylamine prepared by dissolving 3.9 g. (0.1 gram atom) of potassium in an excess of diphenylamine (85 g., 0.5 mole). Fractional distillation gave a colorless liquid (21.0 g., 43.2 percent), boiling at 225° to 230° C. (0.3 mm. Hg) $n_D^{28}$ 1.5590.

Calcd. for $C_{33}H_{47}NSi$: N, 2.88. Found: N, 2.95, 3.01.

The thermal stability was tested by heating a sample of 6.643 g. for five hours at 700° F. A weight loss of 0.2112 g. (equal to 3.2 percent) was found. The compound showed only a very slight change in color after heating.

EXAMPLE V

*4-triethylsilylphenyl-2',4'-dimethylphenylamine*

Potassium metal (9.8 g., 0.25 g. atom) was dissolved under nitrogen at a temperature of 140° to 180° C. in an excess of 2,4-dimethylphenylamine (150 g., 1.25 mole). p-Bromophenyltriethylsilane (68 g., 0.25 mole) was then added drop wise over a period of one hour while the flask containing the reaction mixture was heated by means of an oil bath which was maintained at a temperature of 240° C. An exothermic reaction was observed. After the reaction mixture had been stirred for a period of five hours while being maintained at an oil bath temperature of 240° C., it was cooled to room temperature. Approximately 400 milliliters of water was added with stirring to the reaction mixture followed by 500 milliliters of ether which was also added with stirring. The lower or aqueous layer which formed and which contained the potassium bromide formed during the reaction was drawn off leaving the organic layer containing the product. From the organic layer, the ether and excess 2,4-dimethylphenylamine were removed by distillation and the residue was fractionally distilled. The main fraction (26.5 g., 34 percent of the theoretical quantity), boiled at 180° to 182° C. (1.2 mm. Hg), $n_D^{23}$ 1.5739 which was shown by analysis to be the desired product.

Calcd. for $C_{20}H_{29}NSi$: C, 77.10; H, 9.38; N, 4.50; Si, 9.01. Found: C, 77.37, 77.48; H, 9.30, 9.55; N, 4.48, 4.79; Si, 8.90, 8.82.

EXAMPLE VI (A) *p-Bromophenyltrimethylsilane*

The intermediate, p-bromophenyltrimethylsilane, was prepared from 1,4-dibromobenzene and trimethylchlorosilane by the method given in part (A) of Example II. B.P. 153° to 155° C. (76 mm. Hg), $n_D^{20}$ 1.5268.

Calcd. for $C_9H_{13}SiBr$: Br, 34.87. Found: Br, 34.86.

(B) *4-trimethylsilylphenyl-2',4'-dimethylphenylamine*

The secondary amine was prepared in the same manner as described in Example V by reacting p-bromophenyltrimethylsilane (76.4 g., 0.33 mole) with the potassium salt of 2,4-dimethylphenylamine prepared by dissolving 12.9 g. (0.33 g. atom) of potassium in an excess of 2,4-dimethylphenylamine (200 g., 1.65 moles). Fractional distillation gave 28.2 g. (31.4 percent of the theoretical quantity) of 4-trimethylsilylphenyl-2',4'-dimethylphenylamine boiling at 137° to 151° (0.7 mm.).

Calcd. for $C_{17}H_{23}NSi$: N, 5.20. Found: N, 5.84.

What is claimed is:

1. Silicon-containing arylamines of the formula:

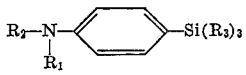

wherein $R_1$ is selected from the group consisting of hydrogen, the organic radical:

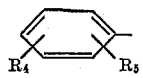

the naphthyl radical, and the organic radical:

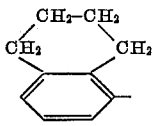

$R_2$ is selected from the group consisting of the organic radical:

the naphthyl radical, and the organic radical:

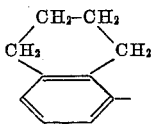

$R_3$ is selected from the group consisting of alkyl radicals and phenylalkyl radicals containing not more than 12 carbon atoms and $R_4$, $R_5$, $R_6$ and $R_7$ are selected from the group consisting of hydrogen, alkyl, alkoxy, phenyl, phenoxy, and trialkylsilyl radicals, said alkyl radical of the alkyl and alkyl-containing substituents of $R_4$, $R_5$, $R_6$ and $R_7$ containing not more than 6 carbon atoms.

2. The silicon-containing arylamine of claim 1 in which $R_3$ is an alkyl radical containing not more than 6 carbon atoms.

3. 4-triethylsilylphenyl-diphenylamine.
4. 4-tri-n-propylsilylphenyl-diphenylamine.
5. 4-tri-n-butylsilylphenyl-diphenylamine.
6. 4-tri-n-pentylsilylphenyl-diphenylamine.
7. 4-triethylsilylphenyl-2',4'-dimethylphenylamine.
8. 4-trimethylsilylphenyl-2',4'-dimethylphenylamine.

References Cited in the file of this patent
UNITED STATES PATENTS 2,754,311    Elliott  ------------------ July 10, 1956
2,779,738    McBride  ---------------- Jan. 29, 1957

OTHER REFERENCES

Gilman et al.: "Journal American Chemical Society," volume 76 (June 20, 1954), pages 3219–20.